Patented Apr. 17, 1945

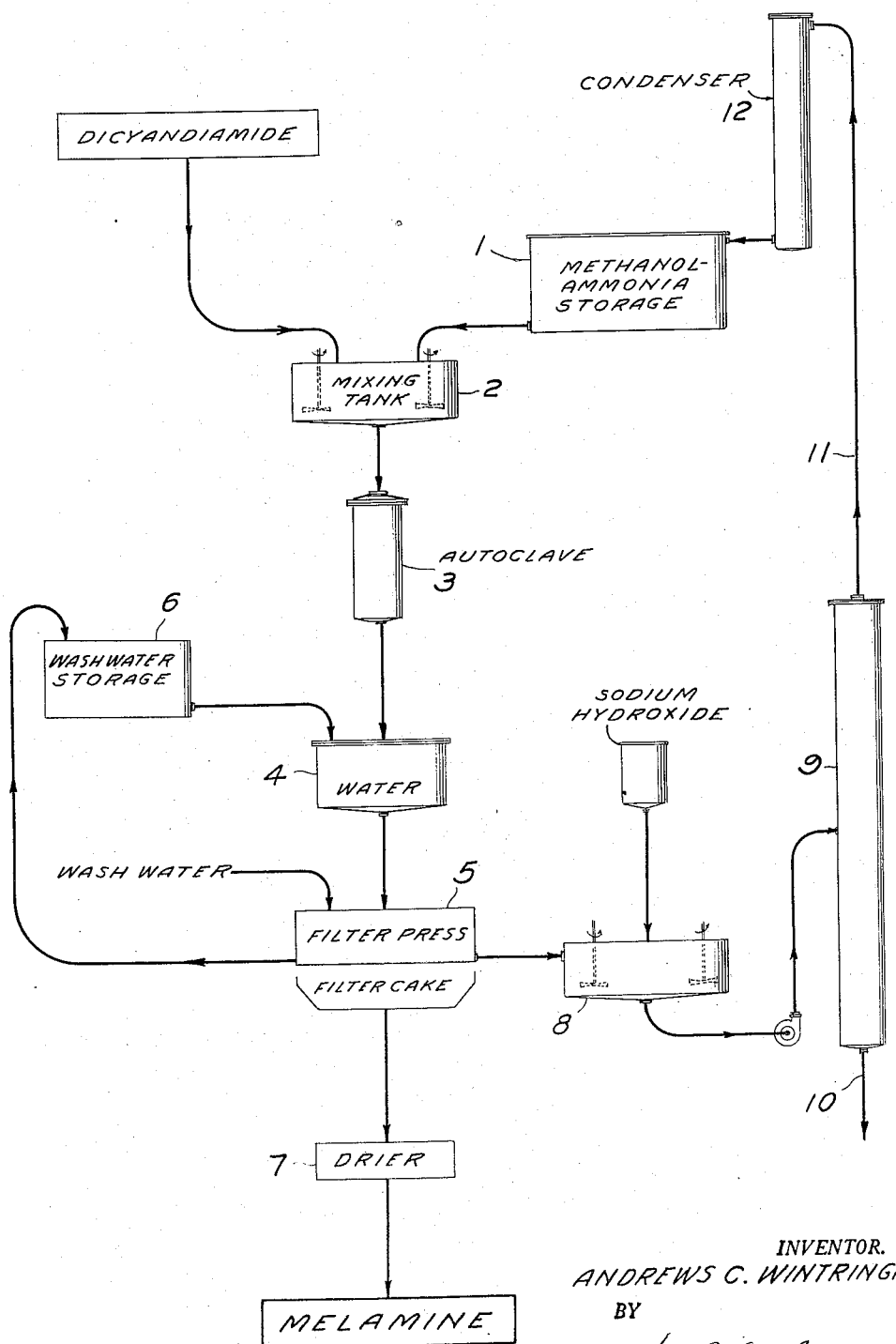

2,373,869

UNITED STATES PATENT OFFICE 2,373,869

MELAMINE PROCESS

Andrews C. Wintringham, Glen Ridge, N. J., assignor to American Cyanamid Company, New York, N. Y., a corporation of Maine Application April 10, 1942, Serial No. 438,407

3 Claims. (Cl. 260—249.5)

This invention relates to the manufacture of melamine by processes which involve the heating of cyanamide or dicyandiamide in a solvent comprising liquid ammonia at high temperatures and pressures, and more particularly to processes of this type in which the solvent is recovered and reused.

It is known that melamine can be obtained by heating a mixture of about 1 part of cyanamide or dicyandiamide with from 1 to 2 parts of liquid ammonia in an autoclave, with or without the addition of a lower aliphatic alcohol or other non-aqueous diluent to reduce the autoclave pressure. In the commercial operation of this process it is now the practice to separate the solvent containing the ammonia from the melamine and to pass this solvent into a stripping column wherein the ammonia, or the ammonia-methanol mixture, can be separated from the wash water or other solvents that may be used in the process. The recovered ammonia or ammonia-methanol mixture is then used to dissolve further amounts of cyanamide or dicyandiamide to prepare a new autoclave charge.

When a melamine plant equipped with an autoclave composed of a high-chromium alloy steel was operated continuously for some time using the process outlined above with recovery and reuse of the methanol-ammonia solvent, it was found that the melamine was contaminated in the autoclave by iron and other metallic impurities. By discharging the contents of the autoclave directly into a large body of water containing an organic hydroxy compound capable of forming a complex water-soluble iron salt, as described in Patent No. 2,324,450, it was possible to retain the greater part of the metallic impurities in the aqueous methanol-ammonia solution separated from the melamine product, and during a typical week's operation the iron content of this solution averaged about 60 parts per million. Since extensive tests had shown that high-chromium alloy steels are ordinarily resistant to attack by the reagents involved in the melamine-forming reaction, this corrosion was entirely unexpected.

After a careful investigation, I finally d'scovered that the ammonia-containing solvent exhibited a tendency to pick up carbon dioxide during its reuse in the process, and that it was the carbonate radical that caused the corrosion resulting in an excessively high content of iron in the autoclave product. I have not as yet definitely determined the reason why the carbonate radical causes an increase of iron in the melamine; it may be due to a corrosive action of the carbonate radical itself, or to guanidine carbonate formed by the reaction of ammonium carbonate with the cyanamide or dicyandiamide in the autoclave, or to a combination of these or other factors. At any event I found that the presence of substantial amounts of carbon dioxide or carbonate radical in the liquid ammonia-containing solvent causes an increase in the amount of metallic impurities in the melamine product and in the recirculating solvent liquor.

It is a principal object of the present invention to improve the process of melamine manufacture outlined above by obviating this source of metallic impurities. It is a further object of the invention to treat the ammonia-containing solvent liquor after its separation from the melamine but before completion of the stripping step with a fixed alkali in order to remove the carbonate radical therefrom.

Only a small amount of carbonate radical is present in the liquor obtained as a filtrate from the melamine slurry formed in the autoclave, which for convenience will be referred to hereinafter as mother liquor. Nevertheless, I found that by adding a strong alkali such as sodium, potassium, or calcium hydroxide to the other liquor after its separation from the melamine but before the completion of the stripping step the content of carbonate radical could be reduced to one-tenth of its former value, and by using a large excess of strong alkali this figure could be reduced even further. My invention in its broader aspects, therefore, consists in the addition of a strong alkali to the mother liquor from a melamine slurry prepared by heating a charge of cyanamide or dicyandiamide in a solvent comprising liquid ammonia, followed by stripping and recovering ammonia or a mixture of ammonia and non-aqueous diluent substantially free from carbon dioxide or carbonate radical for reuse in the process.

The invention will be illustrated in greater detail with reference to the accompanying drawing, the single figure of which is a flow sheet illustrating diagrammatically a preferred method of recovering a carbonate-free methanol-ammonia solution from the mother liquor obtained by the filtration of a melamine slurry. In the process outlined on this flow sheet dicyandiamide is dissolved in a water-free mixture of methanol and ammonia from storage tank 1 in a mixing tank 2, and the resulting solution is charged into an autoclave 3. In this autoclave the charge is heated at temperatures above 100° C., and preferably above 120° C. for several hours, the optimum temperature range being 160–200° C. The dicyandiamide is converted into melamine by this heat treatment, and since the melamine is not soluble in liquid ammonia or in a methanol-ammonia mixture, it is obtained in the form of a slurry.

In order to remove small quantities of alkaline impurities of the type of guanidine, biguanide and guanylurea, the entire contents of the autoclave are discharged directly into a large volume of water in the closed quenching tank 4. A small quantity of glycerine, mannitol or other water-soluble hydroxy compound is dissolved in this water to prevent the precipitation of iron. The ammonia and methanol from the autoclave are of course dissolved in the water during the quenching operation, and the resulting aqueous slurry is cooled to 40–70° C. and filtered in a filter press 5 to separate the solvent from the melamine. The filter cake is washed with a quantity of cold water about equal to that used in the quenching tank 4 and the wash water is stored in a storage tank 6, from which it is introduced into the quenching tank 4 to receive the next batch of melamine from the autoclave. The filter cake from the filter press 5 is dried in a drier 7, preferably at temperatures of about 100° C., and is obtained as a pure melamine product.

In accordance with the present invention the mother liquor obtained as a filtrate from the filter press 5 is mixed with sodium hydroxide, potassium hydroxide, milk of lime or other strong alkali and this alkali addition may advantageously take place in a closed mixing tank 8. Any alkali capable of combining with carbon dioxide in preference to ammonia or capable of liberating ammonia from ammonium carbonate may be employed and the term "strong alkali" is intended to define an alkali such as the oxide or hydroxide of an alkali-forming metal which is capable of accomplishing this result. The sodium hydroxide or other strong alkali should of course be added in quantities at least sufficient to combine with all the carbonic acid radical that may be present in the mother liquor and preferably a large excess of strong alkali is added because of the low concentration of ammonium carbonate in the mother liquor. Amounts on the order of 1 part by weight of NaOH for each 25–50 parts of methanol-ammonia mixture have given good results in practice.

After the strong alkali has been added the mother liquor is introduced near the center of a stripping column 9, which is preferably heated by steam, in which vapors of methanol and ammonia are separated from water containing the sodium carbonate formed in the mixing tank 8. The water and sodium carbonate are discharged to waste from the base of the column through the outlet 10 while the carbonate-free ammonia and methanol vapors are discharged through vapor line 11 to a condenser 12, wherein they are condensed to a methanol-ammonia solvent liquid which is returned to the storage tank 1. By this method a substantially carbonate-free alcohol-ammonia mixture is obtained from the mother liquor from the filter press 5 and excessive corrosion in the autoclave 3 and contamination of the melamine by excessive amounts of iron are avoided.

As a further illustration of the practical advantages obtained by the present invention, the following specific example is given. A melamine plant in continuous daily production was operated on the following schedule: 150 parts by weight of dicyandiamide were dissolved in the mixing tank 2 in 270 parts of an alcohol-ammonia solution analyzing 54% ammonia and 46% methanol. This charge was then pumped into the autoclave 3, which was a large autoclave composed of a chrome-iron alloy containing about 18% chromium, about 8% of nickel, about 0.2% carbon, the balance consisting substantially of iron and stabilizer for the alloy. The autoclave charge was heated at 180–200° C. for several hours at a pressure of 1600–1900 lbs./sq. in. to form a melamine slurry which was then blown into 600 parts by weight of water containing 1 part of mannitol in the quenching tank 4 during a period of about 15 minutes. The solution in the quenching tank was agitated and cooled by recirculating through a cooler to reduce the temperature to about 40–70° C. in order to avoid excessive losses of melamine while retaining any unconverted dicyandiamide in solution and was then filtered in the filter press 5. The mother liquor was passed through the stripping column 9 and the alcohol and ammonia vapors were condensed in condenser 12 and returned to the storage tank 1 and used to dissolve more dicyandiamide to form another autoclave charge.

When the foregoing process was operated with a fresh ammonia-methanol mixture containing no carbon dioxide the amount of iron picked up by corrosion in the autoclave was very small. However, upon continuous daily operation of the plant for a period of time without the addition of strong alkali to the mother liquor from the filter press 5 it was noted that the iron content of the mother liquor became progressively higher, amounting to about 62 parts per million over an average week's operation. At the same time, the amount of iron in the melamine product was increased, despite the use of mannitol to hold back as much iron as possible in the quenching tank 4; during an average week's operation without the addition of alkali to the mother liquor the content of iron in the melamine product averaged 28 parts per million. During this period the recovered methanol-ammonia mixture in the storage tank 1 was found to contain 0.043% of combined carbon dioxide.

After the present invention was made, the practice was adopted of adding 5 parts by weight of 100% sodium hydroxide for each batch of mother liquor from the quenching tank 4 amounting to approximately 860 parts of filtered mother liquor. After the strong alkali had been added to several successive batches of mother liquor in this manner it was found that the carbonate content of the recovered methanol-ammonia blend had been reduced to an average of about 0.023%, and after continued additions of sodium hydroxide to successive batches this figure was reduced to as low as 0.012%. After the methanol-ammonia mixture had been rendered substantially carbonate-free in this manner the average iron content of the mother liquor, over a long period of operation, was only 27 parts per million. At the same time the average iron content of the melamine product was reduced to 13 parts per million. The addition of a strong alkali to the mother liquor from the filter press 5 therefore resulted in a total reduction of the average iron pick up in the autoclave 3 from 90 parts per million to 40 parts per million, with a corresponding improvement in the purity of the melamine product.

What I claim is:

1. In a melamine manufacturing process which comprises the steps of heating in an autoclave a charge consisting of a solution of a member of the group consisting of cyanamide and dicyandiamide in a liquid solvent comprising anhydrous ammonia to form melamine, separating the melamine from said solvent, and thereafter dissolving further amounts of a member of the group consisting of cyanamide and dicyandiamide in said solvent to form another autoclave charge, the method of avoiding excessive corrosion of the autoclave due to the presence of carbonate radical in said solvent which consists in adding to the solvent, after separating the melamine therefrom but before the new charge is formed, an alkali which combines with carbon dioxide in preference to ammonia, said alkali being added in amounts in excess of that necessary to combine with all the carbonate radical present in the solvent, and then distilling the solvent to separate it from the added alkali and the carbonate radical combined therewith.

2. A process for the manufacture of melamine which comprises the steps of heating a charge consisting of a solution of a member of the group consisting of cyanamide and dicyandiamide in a solvent comprising a liquid mixture of anhydrous ammonia and a non-aqueous diluent to form a melamine slurry, separating the solvent from the melamine, adding to the solvent an alkali which combines with carbon dioxide in preference to ammonia in amounts in excess of that necessary to combine with all the carbonic acid radical present, then distilling said solvent and recovering a substantially carbonate-free mixture of anhydrous ammonia and non-aqueous diluent, and dissolving further amounts of a member of the group consisting of cyanamide and dicyandiamide in said mixture to form another charge, whereby excessive metallic impurities in the melamine product due to the presence of carbonate radical during the heating step are avoided.

3. A process for the manufacture of melamine which comprises the steps of heating a charge consisting of a solution of a member of the group consisting of cyanamide and dicyandiamide in a liquid mixture of anhydrous ammonia and a lower aliphatic alcohol to form a melamine slurry, discharging the slurry into water, separating the resulting aqueous solution of ammonia and alcohol from the melamine, adding an alkali which combines with carbon dioxide in preference to ammonia to the solution in amounts in excess of that necessary to combine with all the carbonic acid radical present and stripping and recovering a substantially carbonate-free alcohol-ammonia mixture from the solution, whereby excessive metallic impurities in the melamine product due to the presence of the carbonate radical during the heating step are avoided.

ANDREWS C. WINTRINGHAM.